United States Patent
Arakawa

(10) Patent No.: US 6,724,007 B2
(45) Date of Patent: Apr. 20, 2004

(54) RADIATION IMAGE READ-OUT METHOD AND APPARATUS

(75) Inventor: Satoshi Arakawa, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 161 days.

(21) Appl. No.: 09/969,789

(22) Filed: Oct. 4, 2001

(65) Prior Publication Data

US 2002/0040973 A1 Apr. 11, 2002

(30) Foreign Application Priority Data

Oct. 5, 2000 (JP) ...................................... 2000-305786

(51) Int. Cl.$^7$ .............................................. G03B 42/02
(52) U.S. Cl. .................... 250/586; 250/582; 250/458.1; 250/459.1; 250/363.02
(58) Field of Search ................................ 250/586, 582, 250/583, 584, 585, 588, 589, 590, 484.4, 458.1, 363.02, 363.07, 459.1

(56) References Cited

U.S. PATENT DOCUMENTS

| | | | |
|---|---|---|---|
| 4,816,679 A | | 3/1989 | Sunagawa et al. ........ 250/327.2 |
| 4,922,103 A | | 5/1990 | Kawajiri et al. ......... 250/327.2 |
| 4,926,045 A | * | 5/1990 | Hosoi et al. ................. 250/585 |
| 4,931,642 A | * | 6/1990 | Hosoi et al. ................. 250/586 |
| 6,504,168 B2 | * | 1/2003 | Yasuda ........................ 250/587 |
| 6,507,040 B2 | * | 1/2003 | Isoda .......................... 250/586 |

FOREIGN PATENT DOCUMENTS

JP  1-101540  4/1989  ........... G03B/42/02

OTHER PUBLICATIONS

Japanese Abstract 01–101540, Apr. 19, 1989.

* cited by examiner

*Primary Examiner*—Constantine Hannaher
*Assistant Examiner*—Otilia Gabor
(74) *Attorney, Agent, or Firm*—Sughrue Mion, PLLC

(57) ABSTRACT

Stimulating rays are linearly irradiated onto an area of a stimulable phosphor sheet, and light emitted by the sheet is detected with a CCD line sensor comprising photoelectric converting sections arrayed along the linear area of the sheet exposed to the linear stimulating rays. Accumulated electric charges obtained from each set of n number of the photoelectric converting sections adjacent to one another are read together. The accumulated electric charges, which have thus been read together from the set of the photoelectric converting sections, are taken as an image signal component corresponding to one pixel. The value of n is set in accordance with image recording information and/or diagnostic information.

12 Claims, 8 Drawing Sheets

RADIATION IMAGE READ-OUT METHOD AND APPARATUS

BACKGROUND OF THE INVENTION

1. Field of the Invention

This invention relates to a radiation image read-out method and apparatus, wherein stimulating rays are irradiated to a stimulable phosphor sheet, on which a radiation image has been stored, and light, which is emitted by the stimulable phosphor sheet when the stimulable phosphor sheet is exposed to the stimulating rays, is photoelectrically detected, an image signal representing the radiation image being thereby obtained. This invention particularly relates to a radiation image read-out method and apparatus, wherein a pixel density of a read-out image is capable of being altered.

2. Description of the Related Art

Radiation image recording and reproducing systems utilizing a stimulable phosphor sheet, which comprises a substrate and a layer of a stimulable phosphor overlaid on the substrate, have heretofore been widely used in practice.

With the radiation image recording and reproducing systems, a stimulable phosphor sheet is exposed to radiation carrying image information of an object, such as a human body, and a radiation image of the object is thereby recorded on the stimulable phosphor sheet. Thereafter, stimulating rays, such as a laser beam, are caused to scan the stimulable phosphor sheet in two-dimensional directions. The stimulating rays cause an exposed area of the stimulable phosphor sheet to emit light in proportion to the amount of energy stored thereon during its exposure to the radiation. The light emitted from the exposed area of the stimulable phosphor sheet, upon stimulation thereof, is photoelectrically detected and converted into an electric image signal by photoelectric read-out means.

The image signal, which has been obtained from the radiation image recording and reproducing systems described above, is then subjected to image processing, such as gradation processing and processing in the frequency domain, such that a visible radiation image, which has good image quality and can serve as an effective tool in, particularly, the efficient and accurate diagnosis of an illness, can be obtained. The image signal having been obtained from the image processing is utilized for reproducing a visible image for diagnosis, or the like, on film or displaying a visible image for diagnosis, or the like, on a cathode ray tube (CRT) display device. In cases where the stimulable phosphor sheet, from which the image signal has been detected, is then exposed to erasing light, and energy remaining on the stimulable phosphor sheet is thereby released, the erased stimulable phosphor sheet is capable of being used again for the recording of a radiation image.

Also, a novel radiation image recording and reproducing system aiming at enhancement of a detection quantum efficiency in the formation of the radiation image, i.e., a radiation absorptivity, a light emission efficiency, an emitted light pickup efficiency, and the like, wherein a novel type of stimulable phosphor sheet is utilized, has been proposed in, for example, Japanese Patent Application No. 11(1999)-372978. With the novel type of the stimulable phosphor sheet utilized in the proposed radiation image recording and reproducing system, the radiation absorbing functions and the energy storing functions of the conventional stimulable phosphor sheet are separated from each other.

The novel type of the stimulable phosphor sheet utilized in the proposed radiation image recording and reproducing system contains a layer of a stimulable phosphor for energy storage, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

The novel type of the stimulable phosphor sheet should preferably take on the form combined with a layer of a phosphor for radiation absorption, which is capable of absorbing radiation and being caused to emit light having wavelengths falling within an ultraviolet to visible region. In such cases, energy from the light having wavelengths falling within the ultraviolet to visible region, which light is emitted from the layer of the phosphor for radiation absorption when the layer of the phosphor for radiation absorption is exposed to the radiation carrying image information of an object, (the amount of the energy corresponding to the radiation image information) is stored on the layer of the stimulable phosphor for energy storage. When the stimulable phosphor sheet, on which the radiation image has thus been stored, is scanned with the stimulating rays, the light carrying the radiation image information is emitted from the layer of the stimulable phosphor for energy storage.

The novel type of the stimulable phosphor sheet need not necessarily be provided with the layer of the phosphor for radiation absorption. In such cases, the novel type of the stimulable phosphor sheet is utilized in combination with a fluorescent screen, which is provided with the layer of the phosphor for radiation absorption capable of absorbing radiation and being caused to emit the light having wavelengths falling within the ultraviolet to visible region.

Specifically, in such cases, the fluorescent screen is kept in close contact with the novel type of the stimulable phosphor sheet, and the radiation carrying the image information of the object is irradiated to the fluorescent screen. As a result, the light having wavelengths falling within the ultraviolet to visible region is emitted from the layer of the phosphor for radiation absorption of the fluorescent screen. Also, energy from the light emitted from the phosphor for radiation absorption (the amount of the energy corresponding to the radiation image information) is stored on the layer of the stimulable phosphor for energy storage of the stimulable phosphor sheet. When the stimulable phosphor sheet, on which the radiation image has thus been stored, is scanned with the stimulating rays, the light carrying the radiation image information is emitted from the layer of the stimulable phosphor for energy storage.

Novel radiation image read-out apparatuses for use in the radiation image recording and reproducing systems described above have been proposed in, for example, Japanese Unexamined Patent Publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line sensor comprising a charge coupled device (CCD) image sensor, or the like, is utilized as the photoelectric read-out means.

Basically, the radiation image read-out apparatuses of such types comprise:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a CCD line sensor, which comprises a plurality of photoelectric conversion devices arrayed along the linear area of the stimulable phosphor sheet exposed to the linear stimulating rays, and iii) sub-scanning means for moving the stimulable phosphor sheet with respect to the stimulating ray irradiating means and the CCD line sensor and in a direction (a sub-scanning direction) intersecting with a length direction of the linear area of the stimulable phosphor sheet exposed to the linear stimulating rays (a main scanning direction).

The stimulating ray irradiating means for linearly irradiating the stimulating rays onto the stimulable phosphor sheet in the manner described above may be constituted so as to produce fan beam-like stimulating rays. Alternatively, the stimulating ray irradiating means may be constituted so as to deflect a thin beam and to cause the deflected thin beam to linearly scan the stimulable phosphor sheet.

In cases where the radiation image is to be reproduced from the image signal, which has been obtained with the radiation image read-out apparatuses described above, it is desired that a pixel density of the reproduced image be capable of being altered in accordance with the portion of the object, the image of which was recorded, a region of interest, or the like. For example, in cases where the radiation image is an image of the chest of a human body, or the like, the pixel density of the reproduced image may be comparatively low. In cases where the radiation image is an image of bone structures, an image having a comparatively high pixel density is ordinarily required for making a diagnosis.

Heretofore, in order for the requirement for the pixel density transform to be satisfied, the pixel density of the reproduced radiation image has been altered by subjecting an analog image signal, which has been obtained with the radiation image read-out apparatuses, to analog-to-digital conversion to yield a digital image signal, and thereafter subjecting the digital image signal to pixel density transform processing.

However, in such cases, it is necessary to utilize an expensive frame memory for temporarily storing the digital image signal representing one radiation image. Therefore, the problems occur in that the cost of the radiation image read-out apparatuses cannot be kept low.

SUMMARY OF THE INVENTION

The primary object of the present invention is to provide a radiation image read-out method, wherein a pixel density of a read-out image is capable of being transformed and which is capable of being carried out with a low-cost radiation image read-out apparatus.

Another object of the present invention is to provide an apparatus for carrying out the radiation image read-out method.

The present invention provides a first radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a CCD line sensor comprising a plurality of photoelectric converting sections, which are arrayed along the linear area of the stimulable phosphor sheet exposed to the linear stimulating rays, the received light being subjected to photoelectric conversion performed by the CCD line sensor, and iii) moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays, wherein the improvement comprises the steps of:

a) reading accumulated electric charges of the CCD line sensor, which accumulated electric charges are obtained from each set of n number of the photoelectric converting sections adjacent to one another in the array direction of the plurality of the photoelectric converting sections, where $2 \leq n$, together such that the value of n is capable of being altered, the accumulated electric charges, which have thus been read together from the set of the photoelectric converting sections, being taken as an image signal component corresponding to one pixel, and b) setting the value of n in accordance with image recording information and/or diagnostic information.

The processing for reading the accumulated electric charges together is referred to as the binning processing. The binning processing is a technique wherein, instead of the accumulated electric charge being taken out from one of the photoelectric converting sections, which are formed in the CCD line sensor, the accumulated electric charges at the plurality of the photoelectric converting sections are taken out together.

The term "image recording information" as used herein means the information giving specifics about an image recording operation, e.g., image recording conditions, such as a tube voltage of a radiation source, a tube current of the radiation source, and time over which radiation is irradiated, and conditions, such as the size of the stimulable phosphor sheet and the kind of the stimulable phosphor sheet. The term "diagnostic information" as used herein means the information concerning diagnosis utilizing the radiation image, e.g., the purpose of diagnosis, such as primary screening or close examination, and a region of interest.

The image recording information and the diagnostic information are capable of being acquired with, for example, a technique wherein the information is automatically acquired from a radiation image recording apparatus, or the like, a technique wherein the information is inputted from an identification (ID) information input device, or the like, and a technique wherein the information is transferred from an image display terminal of a medical doctor for instructing the purpose of diagnosis to a radiographic engineer.

As will be understood from the specification, it should be noted that the term "moving a stimulable phosphor sheet with respect to stimulating ray irradiating means and a CCD line sensor" as used herein means movement of the stimulable phosphor sheet relative to the stimulating ray irradiating means and the CCD line sensor, and embraces the cases wherein the stimulable phosphor sheet is moved while the stimulating ray irradiating means and the CCD line sensor are kept stationary, the cases wherein the stimulating ray irradiating means and the CCD line sensor are moved while the stimulable phosphor sheet is kept stationary, and the cases wherein both the stimulable phosphor sheet and the stimulating ray irradiating means and the CCD line sensor are moved. In cases where the stimulating ray irradiating means and the CCD line sensor are moved, they should be moved together with each other.

The first radiation image read-out method in accordance with the present invention may be modified such that the method further comprises the steps of:

performing addition processing on each set of image signal components having been obtained, each of which image signal components corresponds to one of m number of read-out lines standing side by side with respect to the sub-scanning direction, where $2 \leq m$, and which image signal components are adjacent to one another in the sub-scanning direction, such that the value of m is capable of being altered, a sum of the set of the image signal components, which sum has been obtained from the addition processing, being taken as one of image signal components corresponding to one line, and setting the value of m in accordance with the image recording information and/or the diagnostic information.

Also, the first radiation image read-out method in accordance with the present invention may be modified such that the method further comprises the steps of:

altering a sub-scanning speed of the movement in the sub-scanning direction, and setting the sub-scanning speed in accordance with the image recording information and/or the diagnostic information.

The present invention also provides a second radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a CCD line sensor comprising a plurality of photoelectric converting sections, which are arrayed along the linear area of the stimulable phosphor sheet exposed to the linear stimulating rays and along a sub-scanning direction intersecting with a length direction of the linear area of the stimulable phosphor sheet exposed to the linear stimulating rays, the received light being subjected to photoelectric conversion performed by the CCD line sensor, and iii) moving the stimulable phosphor sheet with respect to the stimulating ray irradiating means and the CCD line sensor and in the sub-scanning direction intersecting with the length direction of the linear area of the stimulable phosphor sheet exposed to the linear stimulating rays, wherein the improvement comprises the steps of:

a) reading accumulated electric charges of the CCD line sensor, which accumulated electric charges are obtained from each set of n number of the photoelectric converting sections adjacent to one another in the array direction of the plurality of the photoelectric converting sections along the linear area of the stimulable phosphor sheet exposed to the linear stimulating rays, where $2 \leq n$, and m number of the photoelectric converting sections adjacent to one another in the sub-scanning direction, where $2 \leq m$, together such that the value of n is capable of being altered, the accumulated electric charges, which have thus been read together from the set of the photoelectric converting sections, being taken as an image signal component corresponding to one pixel, and b) setting the value of n and the value of m in accordance with image recording information and/or diagnostic information.

Specifically, in the second radiation image read-out method in accordance with the present invention, the binning processing is performed with respect to both the length direction of the linear area of the stimulable phosphor sheet exposed to the linear stimulating rays (i.e, the main scanning direction) and the sub-scanning direction intersecting with the main scanning direction.

The present invention further provides a third radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a CCD line sensor comprising a plurality of photoelectric converting sections, which are arrayed along the linear area of the stimulable phosphor sheet exposed to the linear stimulating rays, the received light being subjected to photoelectric conversion performed by the CCD line sensor, and iii) moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays, wherein the improvement comprises the steps of:

a) performing addition processing on each set of output signal components having been obtained from the CCD line sensor, each of which output signal components corresponds to one of m number of read-outlines standing side by side with respect to the sub-scanning direction, where $2 \leq m$, and which output signal components are adjacent to one another in the sub-scanning direction, such that the value of m is capable of being altered, a sum of the set of the output signal components, which sum has been obtained from the addition processing, being taken as one of image signal components corresponding to one line, and b) setting the value of m in accordance with image recording information and/or diagnostic information.

The present invention still further provides a fourth radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a CCD line sensor comprising a plurality of photoelectric converting sections, which are arrayed along the linear area of the stimulable phosphor sheet exposed to the linear stimulating rays, the received light being subjected to photoelectric conversion performed by the CCD line sensor, and iii) moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays, wherein the improvement comprises the steps of:
- a) altering a sub-scanning speed of the movement in the sub-scanning direction, and
- b) setting the sub-scanning speed in accordance with image recording information and/or diagnostic information.

The present invention also provides an apparatus for carrying out the first radiation image read-out method in accordance with the present invention. Specifically, the present invention also provides a first radiation image read-out apparatus, comprising:
- i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation,
- ii) a CCD line sensor comprising a plurality of photoelectric converting sections, which are arrayed along the linear area of the stimulable phosphor sheet exposed to the linear stimulating rays, and
- iii) sub-scanning means for moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays, wherein the improvement comprises the provision of:
- a) reading means for reading accumulated electric charges of the CCD line sensor, which accumulated electric charges are obtained from each set of n number of the photoelectric converting sections adjacent to one another in the array direction of the plurality of the photoelectric converting sections, where $2 \leq n$, together such that the value of n is capable of being altered, and taking the accumulated electric charges, which have thus been read together from the set of the photoelectric converting sections, as an image signal component corresponding to one pixel, and
- b) control means for setting the value of n in accordance with image recording information and/or diagnostic information.

The first radiation image read-out apparatus in accordance with the present invention may be modified such that the apparatus further comprises:
signal addition processing means for performing addition processing on each set of image signal components having been obtained from the reading means, each of which image signal components corresponds to one of m number of read-out lines standing side by side with respect to the sub-scanning direction, where $2 \leq m$, and which image signal components are adjacent to one another in the sub-scanning direction, such that the value of m is capable of being altered, and taking a sum of the set of the image signal components, which sum has been obtained from the addition processing, as one of image signal components corresponding to one line, and
control means for setting the value of m in accordance with the image recording information and/or the diagnostic information.

Also, the first radiation image read-out apparatus in accordance with the present invention may be modified such that the apparatus further comprises:
means for altering a sub-scanning speed of the movement in the sub-scanning direction, which movement is performed by the sub-scanning means, and
control means for setting the sub-scanning speed in accordance with the image recording information and/or the diagnostic information.

The present invention further provides an apparatus for carrying out the second radiation image read-out method in accordance with the present invention. Specifically, the present invention further provides a second radiation image read-out apparatus, comprising:
- i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation,
- ii) a CCD line sensor comprising a plurality of photoelectric converting sections, which are arrayed along the linear area of the stimulable phosphor sheet exposed to the linear stimulating rays and along a sub-scanning direction intersecting with a length direction of the linear area of the stimulable phosphor sheet exposed to the linear stimulating rays, and
- iii) sub-scanning means for moving the stimulable phosphor sheet with respect to the stimulating ray irradiating means and the CCD line sensor and in the sub-scanning direction intersecting with the length direction of the linear area of the stimulable phosphor sheet exposed to the linear stimulating rays, wherein the improvement comprises the provision of:
- a) reading means for reading accumulated electric charges of the CCD line sensor, which accumulated electric charges are obtained from each set of n number of the photoelectric converting sections adjacent to one another in the array direction of the plurality of the photoelectric converting sections along the linear area of the stimulable phosphor sheet exposed to the linear stimulating rays, where $2 \leq n$, and m number of the photoelectric converting sections adjacent to one another in the sub-scanning direction, where $2 \leq m$, together such that the value of n is capable of being altered, and taking the accumulated electric charges, which have thus been read together from the set of the photoelectric converting sections, as an image signal component corresponding to one pixel, and
- b) control means for setting the value of n and the value of m in accordance with image recording information and/or diagnostic information.

The present invention still further provides an apparatus for carrying out the third radiation image read-out method in accordance with the present invention. Specifically, the present invention still further provides a third radiation image read-out apparatus, comprising:
- i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation,
- ii) a CCD line sensor comprising a plurality of photoelectric converting sections, which are arrayed along the linear area of the stimulable phosphor sheet exposed to the linear stimulating rays, and
- iii) sub-scanning means for moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays, wherein the improvement comprises the provision of:

a) signal addition processing means for performing addition processing on each set of output signal components having been obtained from the CCD line sensor, each of which output signal components corresponds to one of m number of read-out lines standing side by side with respect to the sub-scanning direction, where $2 \leq m$, and which output signal components are adjacent to one another in the sub-scanning direction, such that the value of m is capable of being altered, and taking a sum of the set of the output signal components, which sum has been obtained from the addition processing, as one of image signal components corresponding to one line, and b) control means for setting the value of m in accordance with image recording information and/or diagnostic information.

The present invention also provides an apparatus for carrying out the fourth radiation image read-out method in accordance with the present invention. Specifically, the present invention also provides a fourth radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a CCD line sensor comprising a plurality of photoelectric converting sections, which are arrayed along the linear area of the stimulable phosphor sheet exposed to the linear stimulating rays, and iii) sub-scanning means for moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays, wherein the improvement comprises the provision of:

a) means for altering a sub-scanning speed of the movement in the sub-scanning direction, which movement is performed by the sub-scanning means, and b) control means for setting the sub-scanning speed in accordance with image recording information and/or diagnostic information.

With the first radiation image read-out method and apparatus in accordance with the present invention, the binning processing is performed, wherein the accumulated electric charges of the CCD line sensor, which accumulated electric charges are obtained from each set of n number of the photoelectric converting sections adjacent to one another in the array direction of the plurality of the photoelectric converting sections, where $2 \leq n$, are read together such that the value of n is capable of being altered. Also, the accumulated electric charges, which have thus been read together from the set of the photoelectric converting sections, are taken as an image signal component corresponding to one pixel. Therefore, the pixel density in the main scanning direction is capable of being altered arbitrarily. Specifically, for example, the accumulated electric charges of the CCD line sensor, which accumulated electric charges are obtained from each set of two photoelectric converting sections adjacent to each other in the array direction of the plurality of the photoelectric converting sections (in this case, n=2), may be read together. Also, the accumulated electric charges, which have thus been read together from each set of the two photoelectric converting sections, may be taken as an image signal component corresponding to one pixel. In such cases, the pixel density in the main scanning direction is capable of being altered to one half of the pixel density occurring when the binning processing is not performed.

Further, with the first radiation image read-out method and apparatus in accordance with the present invention, the value of n, i.e. the number of the photoelectric converting sections subjected to the binning processing with respect to the main scanning direction, is set in accordance with the image recording information and/or the diagnostic information. Therefore, the pixel density in the main scanning direction is capable of being set automatically at a value appropriate for the image recording information and/or the diagnostic information without complicated operations being required.

The first radiation image read-out method and apparatus in accordance with the present invention may be modified such that the addition processing is performed on each set of the image signal components having been obtained from the binning processing described above, each of which image signal components corresponds to one of m number of read-out lines standing side by side with respect to the sub-scanning direction, where $2 \leq m$, and which image signal components are adjacent to one another in the sub-scanning direction, such that the value of m is capable of being altered, the sum of the set of the image signal components, which sum has been obtained from the addition processing, being taken as one of image signal components corresponding to one line; and the value of m is set in accordance with the image recording information and/or the diagnostic information. With the modification of the first radiation image read-out method and apparatus in accordance with the present invention, besides the pixel density in the main scanning direction being capable of being altered in the manner described above, the pixel density in the sub-scanning direction is also capable of being altered arbitrarily. Specifically, for example, the addition processing may be performed on each set of the image signal components having been obtained from the binning processing described above, each of which image signal components corresponds to one of two read-out lines standing side by side with respect to the sub-scanning direction (in this case, m=2), and which image signal components are adjacent to each other in the sub-scanning direction. Also, the sum of each set of the image signal components, which sum has been obtained from the addition processing, may be taken as one of the image signal components corresponding to one line. In such cases, the pixel density in the sub-scanning direction is capable of being altered to one half of the pixel density occurring when the addition processing is not performed.

Further, with the aforesaid modification of the first radiation image read-out method and apparatus in accordance with the present invention, the value of m, i.e. the number of the read-out lines subjected to the addition processing, is set in accordance with the image recording information and/or the diagnostic information. Therefore, the pixel density in the sub-scanning direction is capable of being set automatically at a value appropriate for the image recording information and/or the diagnostic information without complicated operations being required.

Also, the first radiation image read-out method and apparatus in accordance with the present invention may be modified such that the sub-scanning speed of the movement in the sub-scanning direction is altered, and the sub-scanning speed is set in accordance with the image recording information and/or the diagnostic information. In such cases, besides the pixel density in the main scanning direction being capable of being altered in the manner described above, the pixel density in the sub-scanning direction is also capable of being altered arbitrarily by the alteration of the sub-scanning speed. Specifically, for example, in cases where the sub-scanning speed is altered to two times as high as the original sub-scanning speed, the pixel density in the sub-scanning direction is capable of being altered to one half of the pixel density occurring when the sub-scanning speed is set at the original sub-scanning speed. Also, since the sub-scanning speed is set in accordance with the image recording information and/or the diagnostic information, the pixel density in the sub-scanning direction is capable of being set automatically at a value appropriate for the image recording information and/or the diagnostic information without complicated operations being required.

With the second radiation image read-out method and apparatus in accordance with the present invention, the binning processing with respect to the main scanning direction is performed in the same manner as that in the first radiation image read-out method and apparatus in accordance with the present invention. Therefore, the pixel density in the main scanning direction is capable of being altered arbitrarily.

Also, with the second radiation image read-out method and apparatus in accordance with the present invention, as the CCD line sensor, the CCD line sensor comprising the plurality of the photoelectric converting sections, which are arrayed along the linear area of the stimulable phosphor sheet exposed to the linear stimulating rays and along the sub-scanning direction, is employed. Further, the binning processing is performed with respect to both the main scanning direction and the sub-scanning direction. Therefore, the number of stages for reading the accumulated electric charges is capable of being kept small. Accordingly, noise is capable of being reduced, and the reading speed is capable of being kept high.

Further, with the second radiation image read-out method and apparatus in accordance with the present invention, the value of n, i.e. the number of the photoelectric converting sections subjected to the binning processing with respect to the main scanning direction, is set in accordance with the image recording information and/or the diagnostic information. Therefore, the pixel density in the main scanning direction is capable of being set automatically at a value appropriate for the image recording information and/or the diagnostic information without complicated operations being required.

Furthermore, with the second radiation image read-out method and apparatus in accordance with the present invention, the value of m, i.e. the number of the photoelectric converting sections subjected to the binning processing with respect to the sub-scanning direction, is set in accordance with the image recording information and/or the diagnostic information. Therefore, the reading speed, or the like, is capable of being set automatically at a value appropriate for the image recording information and/or the diagnostic information without complicated operations being required.

With the third radiation image read-out method and apparatus in accordance with the present invention, the addition processing is performed on each set of output signal components having been obtained from the CCD line sensor, each of which output signal components corresponds to one of m number of read-out lines standing side by side with respect to the sub-scanning direction, where $2 \leq m$, and which output signal components are adjacent to one another in the sub-scanning direction. Also, the sum of each set of the output signal components, which sum has been obtained from the addition processing, is taken as one of the image signal components corresponding to one line. Therefore, the pixel density in the sub-scanning direction is capable of being altered arbitrarily. Specifically, for example, the addition processing may be performed on each set of the output signal components having been obtained from the CCD line sensor, each of which output signal components corresponds to one of two read-out lines standing side by side with respect to the sub-scanning direction (in this case, m=2), and which output signal components are adjacent to each other in the sub-scanning direction. Also, the sum of each set of the output signal components, which sum has been obtained from the addition processing, may be taken as one of the image signal components corresponding to one line. In such cases, the pixel density in the sub-scanning direction is capable of being altered to one half of the pixel density occurring when the addition processing is not performed.

Further, with the third radiation image read-out method and apparatus in accordance with the present invention, the value of m, i.e. the number of the read-out lines subjected to the addition processing, is set in accordance with the image recording information and/or the diagnostic information. Therefore, the pixel density in the sub-scanning direction is capable of being set automatically at a value appropriate for the image recording information and/or the diagnostic information without complicated operations being required.

With the fourth radiation image read-out method and apparatus in accordance with the present invention, the sub-scanning speed of the movement in the sub-scanning direction is altered. By the alteration of the sub-scanning speed, the pixel density in the sub-scanning direction is capable of being altered arbitrarily. Specifically, for example, in cases where the sub-scanning speed is altered to two times as high as the original sub-scanning speed, the pixel density in the sub-scanning direction is capable of being altered to one half of the pixel density occurring when the sub-scanning speed is set at the original sub-scanning speed.

Also, with the fourth radiation image read-out method and apparatus in accordance with the present invention, the sub-scanning speed is set in accordance with the image recording information and/or the diagnostic information. Therefore, the pixel density in the sub-scanning direction is capable of being set automatically at a value appropriate for the image recording information and/or the diagnostic information without complicated operations being required.

Further, with the first, second, third, and fourth radiation image read-out methods in accordance with the present invention and the first, second, third, and fourth radiation image read-out apparatuses in accordance with the present invention, the pixel density is altered at the stage at which an analog image signal is formed. Therefore, an expensive frame memory for temporarily storing a digital image signal representing one radiation image need not be utilized. Accordingly, the cost of the radiation image read-out apparatuses is capable of being kept low.

DESCRIPTION OF THE PREFERRED EMBODIMENTS

The present invention will hereinbelow be described in further detail with reference to the accompanying drawings.

Figure 1:
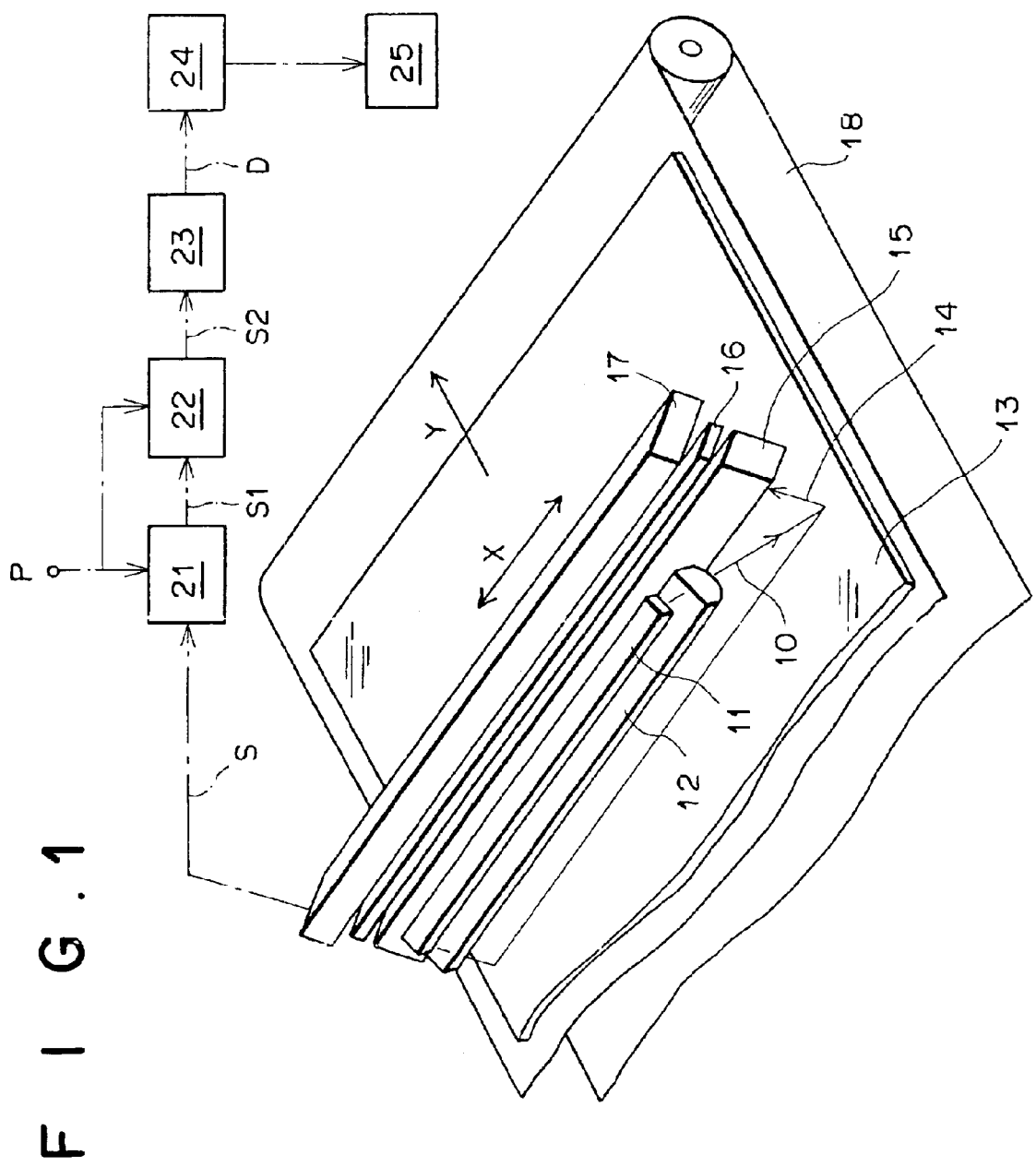
FIG. 1 is a perspective view showing a first embodiment of the radiation image read-out apparatus in accordance with the present invention.
Figure 2:
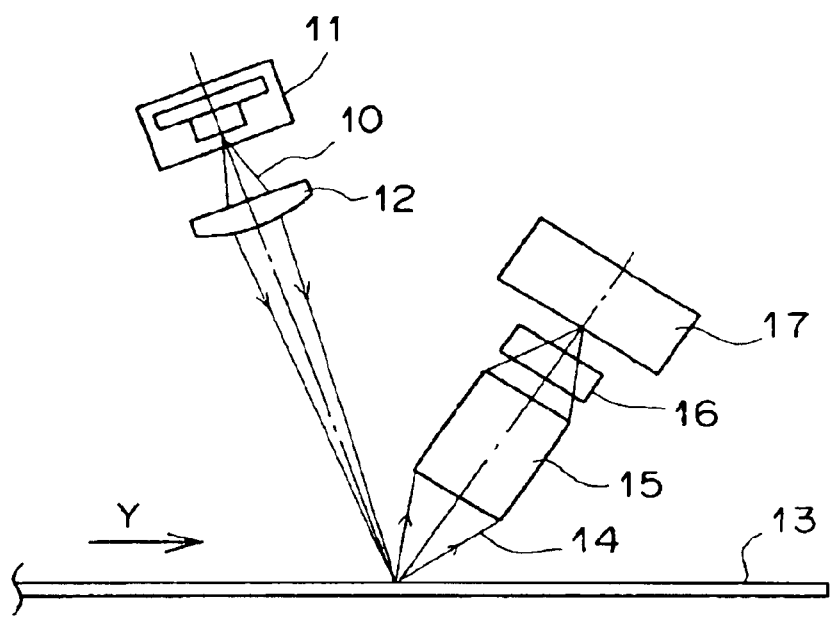
FIG. 2 is a side view showing a read-out optical system employed in the first embodiment of FIG. 1.
Figure 3:
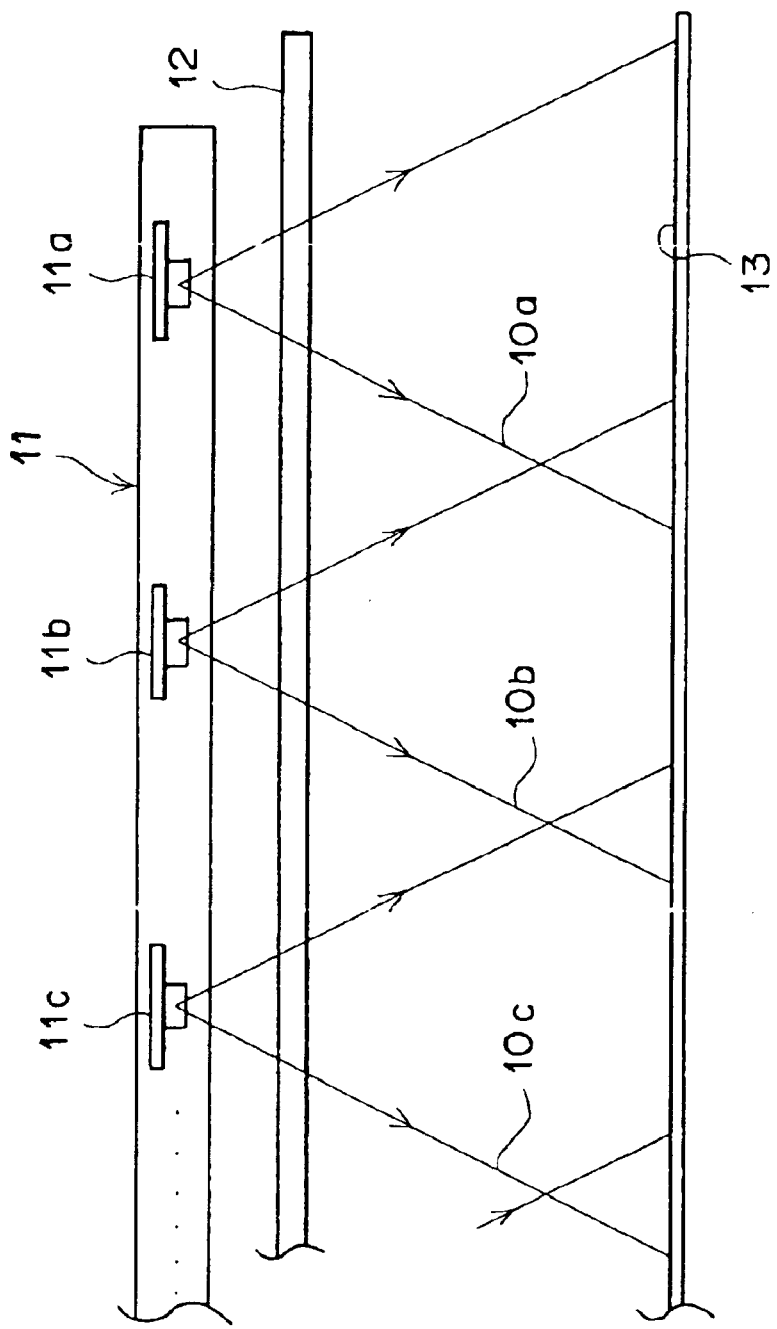
FIG. 3 is a front view showing the read-out optical system of FIG. 2.

FIG. 1 is a perspective view showing a first embodiment of the radiation image read-out apparatus in accordance with the present invention. FIG. 2 is a side view showing a read-out optical system employed in the first embodiment of FIG. 1. FIG. 3 is a front view showing the read-out optical system of FIG. 2.

As illustrated in FIG. 1, the radiation image read-out apparatus comprises a laser diode array 11, which acts as stimulating ray irradiating means and produces fan beam-like stimulating rays 10. The radiation image read-out apparatus also comprises a cylindrical lens 12 for converging the stimulating rays 10 only in the plane of the sheet of FIG. 2 in order to form linear stimulating rays 10. The radiation image read-out apparatus further comprises a lens array 15 for collecting light 14, which has been emitted from a linear area of a stimulable phosphor sheet 13 exposed to the linear stimulating rays 10. The radiation image read-out apparatus still further comprises a stimulating ray cut-off filter 16, which is located in an optical path of the emitted light 14 having passed through the lens array 15. The radiation image read-out apparatus also comprises a CCD line sensor 17 for detecting the emitted light 14, which has passed through the stimulating ray cut-off filter 16. The radiation image read-out apparatus further comprises an endless belt 18, which acts as sub-scanning means for moving the stimulable phosphor sheet 13 at a predetermined speed and in the direction indicated by the arrow Y, i.e. in the direction normal to the length direction (the direction indicated by the double headed arrow X) of the linear area of the stimulable phosphor sheet 13 exposed to the linear stimulating rays 10.

The radiation image read-out apparatus still further comprises a reading circuit 21 for reading electric charges S from the CCD line sensor 17 through binning processing, which will be described later, and feeding out an output signal S1. The radiation image read-out apparatus also comprises a signal addition processing circuit 22 for performing addition processing, which will be described later, on the output signal S1, which has been received from the reading circuit 21, and feeding out an output signal S2. The radiation image read-out apparatus further comprises an analog-to-digital converter 23 for digitizing the output signal S2, which has been received from the signal addition processing circuit 22, into a digital image signal D. The digital image signal D, which has been obtained from the analog-to-digital converter 23, is fed into an image processing unit 24, which performs image processing on the digital image signal D. The digital image signal D, which has been obtained from the image processing performed by the image processing unit 24, is fed into an image reproducing apparatus 25.

As illustrated in FIG. 3, the laser diode array 11 comprises a plurality of laser diodes 11a, 11b, 11c, . . . arrayed in a line. By way of example, each of the laser diodes 11a, 11b, 11c, . . . produces a laser beam (the stimulating rays) having a wavelength falling within the range of 650 nm to 690 nm. The laser diodes 11a, 11b, 11c, . . . respectively produce stimulating rays 10a, 10b, 10c, . . . in a divergent light state. The stimulating rays 10a, 10b, 10c, . . . , which have been produced by the laser 11 diodes 11a, 11b, 11c, are converged by the cylindrical lens 12 with respect to only one direction and into fan beams. The stimulating rays 10, which are composed of the fan beams standing in a row, are linearly irradiated onto the linear area of the stimulable phosphor sheet 13.

Figure 4:
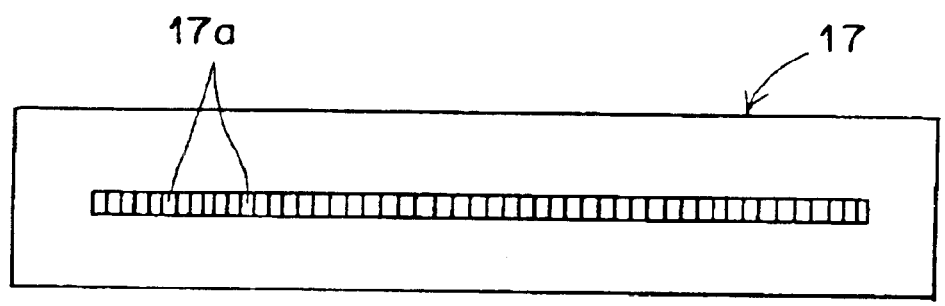
FIG. 4 is a plan view showing a CCD line sensor employed in the first embodiment of FIG. 1.

FIG. 4 is a plan view showing the CCD line sensor 17 employed in the first embodiment of FIG. 1. As illustrated in FIG. 4, the CCD line sensor 17 comprises a plurality of sensor chips (photoelectric converting sections) 17a, 17a, . . . , which are arrayed in a line. In this embodiment, the CCD line sensor 17 is located in an orientation such that the sensor chips 17a, 17a, . . . , which act as the photoelectric converting sections, stand side by side along the length direction of the linear area of the stimulable phosphor sheet 13 exposed to the linear stimulating rays 10, i.e. along the direction indicated by the double headed arrow X in FIG. 1. In cases where the stimulable phosphor sheet 13 has a large width, the CCD line sensor 17 may be composed of a plurality of line sensors, which are arrayed so as to stand in a row along the length direction of the CCD line sensor 17.

Figure 5:
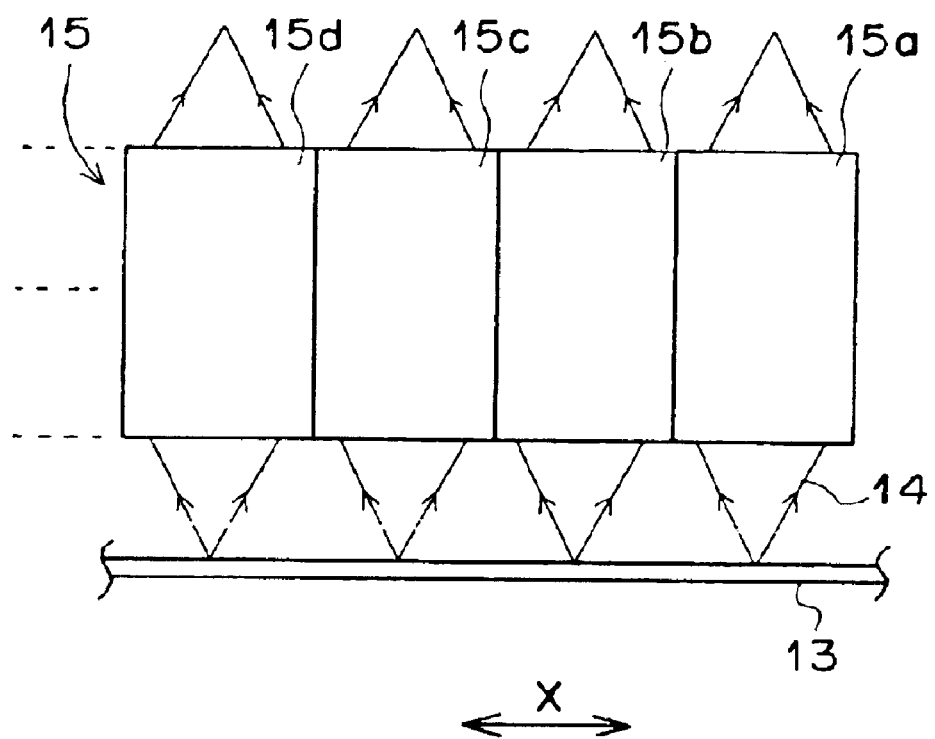
FIG. 5 is a front view showing a lens array employed in the first embodiment of FIG. 1.

FIG. 5 is a front view showing the lens array 15 employed in the first embodiment of FIG. 1. As illustrated in FIG. 5, the lens array 15 comprises, for example, a plurality of distributed index lenses 15a, 15b, 15c, 15d, . . . , which are arrayed in a line. Each of the distributed index lenses 15a, 15b, 15c, 15d, . . . collects the emitted light 14 having been emitted by the stimulable phosphor sheet 13. Also, as illustrated in FIG. 1, each of the distributed index lenses 15a, 15b, 15c, 15d, . . . guides the emitted light 14 toward the CCD line sensor 17. The lens array 15 is located in an orientation such that the distributed index lenses 15a, 15b, 15c, 15d, . . . stand side by side along the length direction of the linear area of the stimulable phosphor sheet 13 exposed to the linear stimulating rays 10, i.e. along the direction indicated by the double headed arrow X in FIG. 1.

How the first embodiment of the radiation image read-out apparatus in accordance with the present invention operates will be described hereinbelow.

The stimulable phosphor sheet 13 carries a radiation image of an object stored thereon by, for example, being exposed to radiation carrying radiation image information of the object. The stimulable phosphor sheet 13, on which the radiation image has been stored, is moved by the endless belt 18 at a predetermined speed and in the direction indicated by the arrow Y. Also, the stimulating rays 10 are produced by the laser diode array 11. The stimulating rays 10, which have been produced by the laser diode array 11, are linearly irradiated to an area of the stimulable phosphor sheet 13.

When the stimulating rays 10 are linearly irradiated to the area of the stimulable phosphor sheet 13, the linear area of the stimulable phosphor sheet 13 exposed to the linear stimulating rays 10 emits the light 14 having intensity in accordance with the radiation image having been stored on the stimulable phosphor sheet 13. The emitted light 14, which may be, for example, blue light, is collected by the lens array 15 and guided toward the CCD line sensor 17. The emitted light 14 is photoelectrically detected by the CCD line sensor 17. The stimulating rays 10, which are reflected from the stimulable phosphor sheet 13 and travel toward the CCD line sensor 17, are filtered out by the stimulating ray cut-off filter 16.

The CCD line sensor 17 photoelectrically detects the emitted light 14 and feeds out the electric charges S, which correspond to the intensity of the emitted light 14 (i.e., which represent the radiation image having been stored on the stimulable phosphor sheet 13). The electric charges S are read by the reading circuit 21 through the binning processing, which will be described later. In the reading circuit 21, the electric charges S are further subjected to processing, such as amplification, and converted into the analog image signal S1. The analog image signal S1 is fed into the signal addition processing circuit 22. In the signal addition processing circuit 22, the analog image signal S1 is subjected to the addition processing, which will be described later, and converted into the output signal S2. The output signal S2, which has been obtained from the signal addition processing circuit 22, is fed into the analog-to-digital converter 23 and converted by the analog-to-digital converter 23 into the digital image signal D.

Thereafter, the digital image signal D is fed into the image processing unit 24, which performs the image processing, such as gradation processing, on the digital image signal D. The digital image signal D, which has been obtained from the image processing performed by the image processing unit 24, is fed into the image reproducing apparatus 25 and is utilized for reproducing the radiation image, which has been stored on the stimulable phosphor sheet 13, as a visible image. The image reproducing apparatus 25 may be displaying means constituted of a CRT display device, or the like. Alternatively, the image reproducing apparatus 25 may be a recording apparatus for performing light scanning recording on photosensitive film.

How the binning processing and the addition processing for transforming the pixel density of the read-out image are performed will be described hereinbelow. By way of example, as illustrated in FIG. 4, the CCD line sensor 17 employed in the first embodiment is provided with 4,096 sensor chips 17a, 17a, . . . , which are arrayed in a line. In the CCD line sensor 17 employed in this embodiment, the pixel size, i.e. the array pitch of the sensor chips 17a, 17a, . . . acting as the photoelectric converting sections, is equal to 12.5 $\mu$m.

Also, the speed at which the stimulable phosphor sheet 13 is moved by the endless belt 18 acting as the sub-scanning means, i.e. the sub-scanning speed, is fixed at 100 $\mu$m per one-line read-out time.

In this embodiment, in cases where the radiation image having been recorded on the stimulable phosphor sheet 13 is a radiation image of bone structures of a human body, or the like, and the radiation image of the bone structures of the human body, or the like, is to be read out from the stimulable phosphor sheet 13, the pixel density is set to be comparatively high, and the radiation image read-out operation is performed with a pixel size of 100 $\mu$m. Also, in cases where the radiation image having been recorded on the stimulable phosphor sheet 13 is a radiation image of the chest of a human body, or the like, and the radiation image of the chest of the human body, or the like, is to be read out from the stimulable phosphor sheet 13, the pixel density is set to be comparatively low, and the radiation image read-out operation is performed with a pixel size of 200 $\mu$m.

For such purposes, a pixel size instructing signal P in accordance with the portion of the object, the image of which was recorded, a region of interest, radiation image recording conditions, and the like, is inputted from a read-out control circuit (not shown) into the reading circuit 21 and the signal addition processing circuit 22. In cases where the pixel size instructed by the pixel size instructing signal P is 100 $\mu$m, the reading circuit 21 reads the accumulated electric charges of the CCD line sensor 17, which accumulated electric charges are obtained from each set of eight sensor chips 17a, 17a, . . . adjacent to one another in the main scanning direction, together. In this manner, the binning processing is performed with respect to the accumulated electric charges, which are obtained from each set of the eight sensor chips 17a, 17a, . . . adjacent to one another in the main scanning direction. The accumulated electric charges, which have thus been read together from each set of the eight sensor chips 17a, 17a, . . . , are taken as the read electric charges corresponding to one pixel. As a result, the pixel size in the main scanning direction becomes equal to 8×12.5 $\mu$m=100 $\mu$m.

Also, in the reading circuit 21, the read electric charges S, which have thus been read through the binning processing, are subjected to the processing, such as amplification, and converted into the analog image signal S1. The analog image signal S1 is fed into the signal addition processing circuit 22. In cases where the pixel size instructed by the pixel size instructing signal P is 100 $\mu$m, the signal addition processing circuit 22 feeds out the received analog image signal S1 directly as the output signal S2. Specifically, in this case, the signal addition processing is not performed. As a result, the pixel size in the sub-scanning direction becomes equal to 100 $\mu$m.

With the processing described above, in cases where the pixel size instructed by the pixel size instructing signal P is 100 $\mu$m, a signal representing an image, in which the pixel size in the main scanning direction and the pixel size in the sub-scanning direction are equal to 100 $\mu$m, is obtained as the output signal S2 from the signal addition processing circuit 22.

As described above, pieces of information representing the portion of the object, the image of which was recorded, the region of interest, the radiation image recording conditions, and the like, are capable of being acquired with, for example, the technique wherein the information is automatically acquired from a radiation image recording apparatus, or the like, the technique wherein the information is inputted from an identification (ID) information input device, or the like, and the technique where in the information is transferred from an image display terminal of a medical doctor for instructing the purpose of diagnosis to a radiographic engineer. Therefore, the pixel size may be determined in accordance with the pieces of information described above, and the pixel size instructing signal P, which instructs the determined pixel size, may be formed.

In cases where the pixel size instructed by the pixel size instructing signal P is 200 $\mu$m, the processing is performed in the manner described below. Specifically, in such cases, the reading circuit 21 reads the accumulated electric charges of the CCD line sensor 17, which accumulated electric charges are obtained from each set of 16 sensor chips 17a, 17a, . . . adjacent to one another in the main scanning direction, together. In this manner, the binning processing is performed with respect to the accumulated electric charges, which are obtained from each set of the 16 sensor chips 17a, 17a, . . . adjacent to one another in the main scanning direction. The accumulated electric charges, which have thus been read together from each set of the 16 sensor chips 17a, 17a, . . . , are taken as the read electric charges corresponding to one pixel. As a result, the pixel size in the main scanning direction becomes equal to 16×12.5 µm=200 µm.

Also, in the reading circuit 21, the read electric charges S, which have thus been read through the binning processing, are subjected to the processing, such as amplification, and converted into the analog image signal S1. The analog image signal S1 is fed into the signal addition processing circuit 22. In cases where the pixel size instructed by the pixel size instructing signal P is 200 µm, the signal addition processing circuit 22 performs the addition processing on the received analog image signal S1. Specifically, the addition processing is performed on each set of the signal components of the analog image signal S1, each of which signal components corresponds to one of two read-out lines standing side by side with respect to the sub-scanning direction, and which signal components are adjacent to each other in the sub-scanning direction. Also, the sum of each set of the signal components, which sum has been obtained from the addition processing, is taken as one of image signal components corresponding to one line. The addition processing is performed in this manner, and the output signal S2 is obtained from the signal addition processing circuit 22. As a result, in this case, the pixel size in the sub-scanning direction becomes equal to 200 µm.

With the processing described above, in cases where the pixel size instructed by the pixel size instructing signal P is 200 µm, a signal representing an image, in which the pixel size in the main scanning direction and the pixel size in the sub-scanning direction are equal to 200 µm, is obtained as the output signal S2 from the signal addition processing circuit 22.

In the first embodiment described above, the number of the sensor chips 17a, 17a, . . . , which are subjected to the binning processing with respect to the main scanning direction, and the number of the read-out lines, which are subjected to the addition processing, are set in accordance with the image recording information and/or the diagnostic information. Therefore, the pixel density in the main scanning direction and the pixel density in the sub-scanning direction are capable of being set automatically at values appropriate for the image recording information and/or the diagnostic information without complicated operations being required.

In the first embodiment described above, both the binning processing with respect to the main scanning direction and the signal addition processing with respect to each set of the read-out lines are performed, and both the pixel density in the main scanning direction and the pixel density in the sub-scanning direction are altered. Alternatively, only the binning processing with respect to the main scanning direction may be performed, and only the pixel density in the main scanning direction may be altered. As another alternative, only the signal addition processing with respect to each set of the read-out lines may be performed, and only the pixel density in the sub-scanning direction may be altered.

Figure 6:
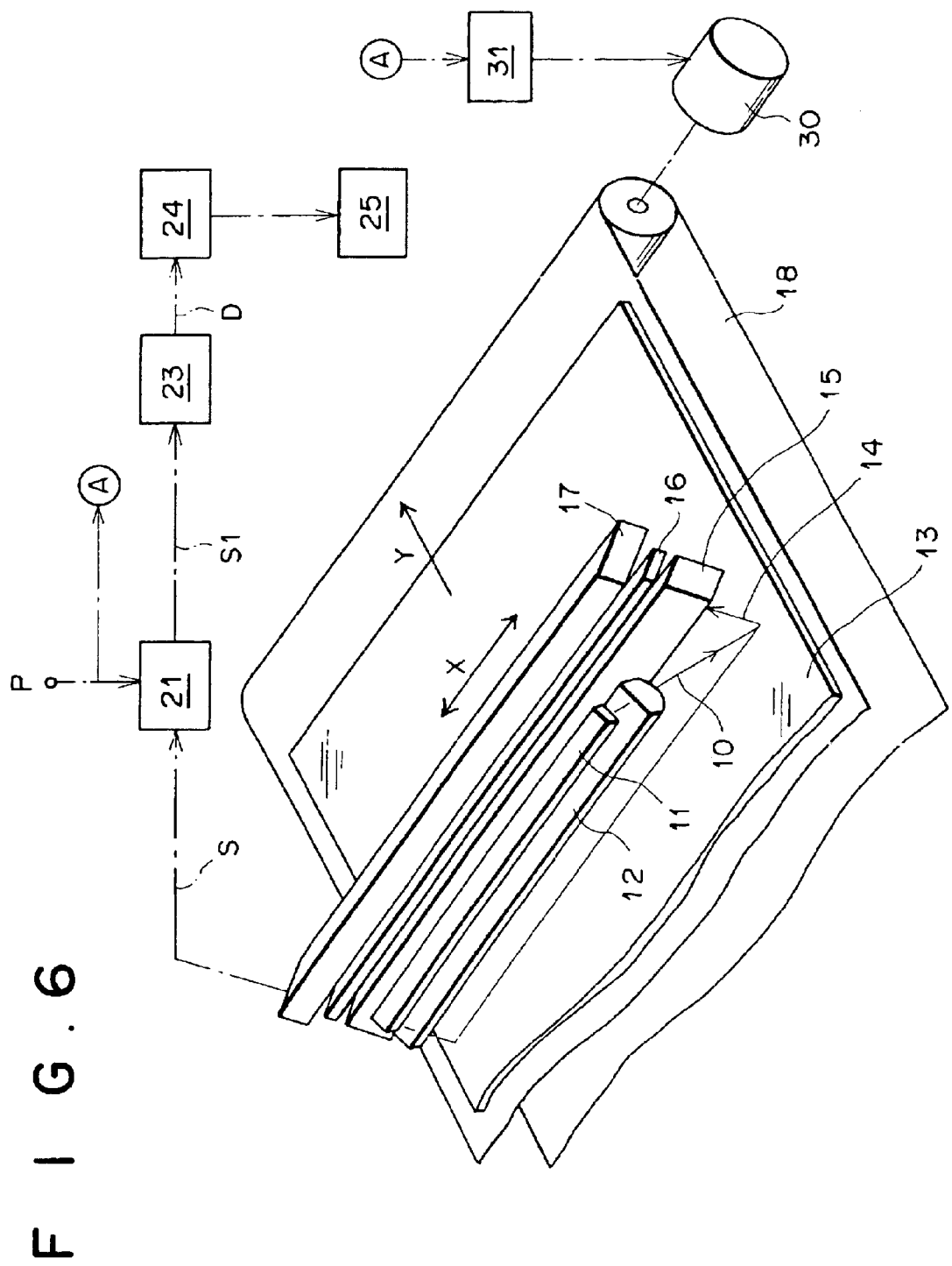
FIG. 6 is a perspective view showing a second embodiment of the radiation image read-out apparatus in accordance with the present invention.

A second embodiment of the radiation image read-out apparatus in accordance with the present invention will be described hereinbelow with reference to FIG. 6. In FIG. 6 (and in FIG. 7), similar elements are numbered with the same reference numerals with respect to FIG. 1.

The second embodiment of the radiation image read-out apparatus illustrated in FIG. 6 is constituted basically in the same manner as that in the first embodiment of FIG. 1, except that the signal addition processing circuit 22 is omitted, and a variable speed motor 30 and a motor control circuit 31 are provided. The variable speed motor 30 drives the endless belt 18 such that the movement speed of the endless belt 18 is capable of being altered. The motor control circuit 31 controls the variable speed motor 30. The variable speed motor 30 and the motor control circuit 31 constitute sub-scanning speed altering means. Specifically, the motor control circuit 31 alters the rotation speed of the variable speed motor 30 in accordance with the pixel size instructing signal P described above, and the movement speed of the stimulable phosphor sheet 13, i.e. the sub-scanning speed, is thereby altered arbitrarily.

How the pixel density or the pixel size is altered in the second embodiment will be described hereinbelow. In the second embodiment, in cases where the radiation image having been recorded on the stimulable phosphor sheet 13 is a radiation image of bone structures of a human body, or the like, and the radiation image of the bone structures of the human body, or the like, is to be read out from the stimulable phosphor sheet 13, the pixel density is set to be comparatively high, and the radiation image read-out operation is performed with a pixel size of 100 µm. Also, in cases where the radiation image having been recorded on the stimulable phosphor sheet 13 is a radiation image of the chest of a human body, or the like, and the radiation image of the chest of the human body, or the like, is to be read out from the stimulable phosphor sheet 13, the pixel density is set to be comparatively low, and the radiation image read-out operation is performed with a pixel size of 200 µm.

For such purposes, the pixel size instructing signal P in accordance with the portion of the object, the image of which was recorded, the region of interest, the radiation image recording conditions, and the like, is inputted from the read-out control circuit (not shown) into the reading circuit 21. In cases where the pixel size instructed by the pixel size instructing signal P is 100 µm, the reading circuit 21 reads the accumulated electric charges of the CCD line sensor 17, which accumulated electric charges are obtained from each set of eight sensor chips 17a, 17a, . . . adjacent to one another in the main scanning direction, together. In this manner, the binning processing is performed with respect to the accumulated electric charges, which are obtained from each set of the eight sensor chips 17a, 17a, . . . adjacent to one another in the main scanning direction. The accumulated electric charges, which have thus been read together from each set of the eight sensor chips 17a, 17a, . . . , are taken as the read electric charges corresponding to one pixel. As a result, the pixel size in the main scanning direction becomes equal to 8×12.5 µm=100 µm.

Also, in cases where the pixel size instructed by the pixel size instructing signal P is 100 µm, the motor control circuit 31 sets the rotation speed of the variable speed motor 30 such that the speed at which the stimulable phosphor sheet 13 is moved by the endless belt 18, i.e. the sub-scanning speed, becomes equal to 100 µm per one-line read-out time. As a result, the pixel size in the sub-scanning direction becomes equal to 100 µm.

With the processing described above, in cases where the pixel size instructed by the pixel size instructing signal P is 100 µm, a signal representing an image, in which the pixel size in the main scanning direction and the pixel size in the sub-scanning direction are equal to 100 μm, is obtained as the analog image signal S1 from the reading circuit 21.

In cases where the pixel size instructed by the pixel size instructing signal P is 200 μm, the processing is performed in the manner described below. Specifically, in such cases, the reading circuit 21 reads the accumulated electric charges of the CCD line sensor 17, which accumulated electric charges are obtained from each set of 16 sensor chips 17a, 17a, . . . adjacent to one another in the main scanning direction, together. In this manner, the binning processing is performed with respect to the accumulated electric charges, which are obtained from each set of the 16 sensor chips 17a, 17a, . . . adjacent to one another in the main scanning direction. The accumulated electric charges, which have thus been read together from each set of the 16 sensor chips 17a, 17a, . . . , are taken as the read electric charges corresponding to one pixel. As a result, the pixel size in the main scanning direction becomes equal to 16×12.5 μm=200 μm.

Also, in cases where the pixel size instructed by the pixel size instructing signal P is 200 μm, the motor control circuit 31 sets the rotation speed of the variable speed motor 30 such that the speed at which the stimulable phosphor sheet 13 is moved by the endless belt 18, i.e. the sub-scanning speed, becomes equal to 200 μm per one-line read-out time. As a result, the pixel size in the sub-scanning direction becomes equal to 200 μm.

With the processing described above, in cases where the pixel size instructed by the pixel size instructing signal P is 200 μm, a signal representing an image, in which the pixel size in the main scanning direction and the pixel size in the sub-scanning direction are equal to 200 μm, is obtained as the analog image signal S1 from the reading circuit 21.

As described above, in the first embodiment and the second embodiment, the pixel density is altered at the stage at which the analog image signal is formed. Therefore, an expensive frame memory for temporarily storing a digital image signal representing one radiation image need not be utilized. Accordingly, the cost of the radiation image read-out apparatuses is capable of being kept low.

Figure 7:
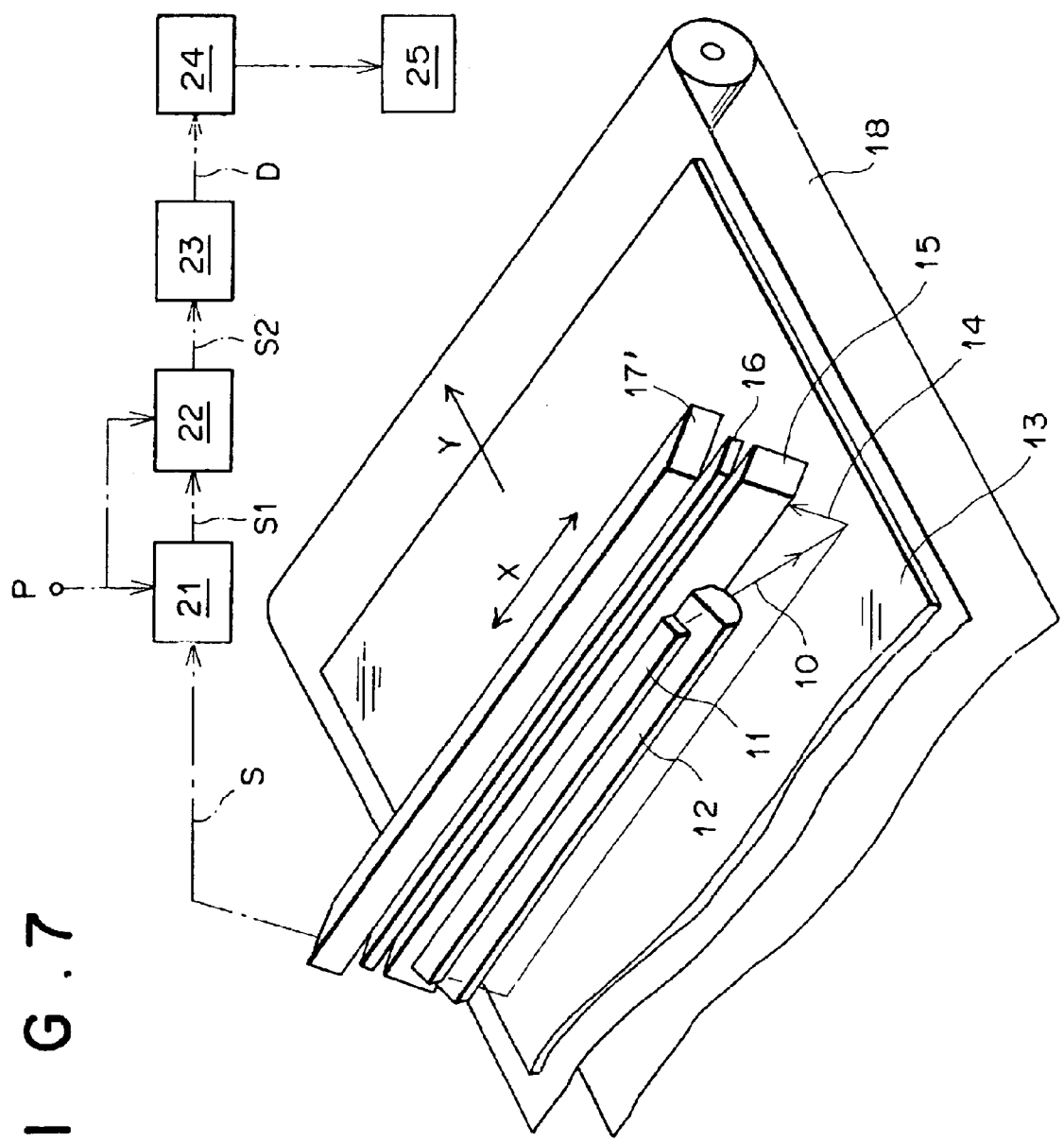
FIG. 7 is a perspective view showing a third embodiment of the radiation image read-out apparatus in accordance with the present invention.
Figure 8:
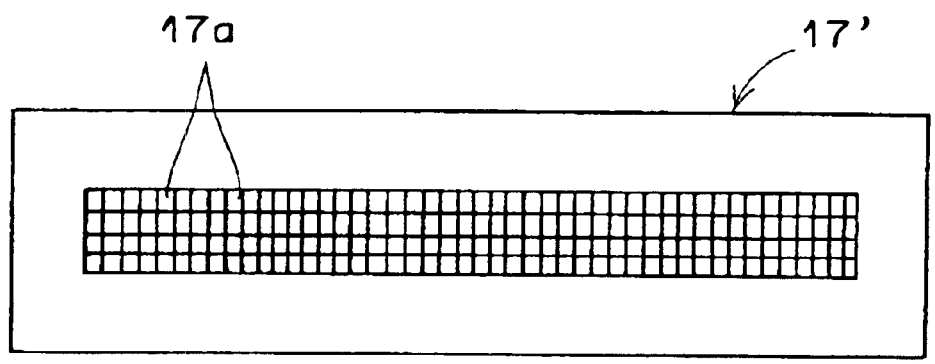
FIG. 8 is a plan view showing a CCD line sensor employed in the third embodiment of FIG. 7.

A third embodiment of the radiation image read-out apparatus in accordance with the present invention will be described hereinbelow with reference to FIG. 7. The third embodiment of the radiation image read-out apparatus illustrated in FIG. 7 is constituted basically in the same manner as that in the first embodiment of FIG. 1, except that a CCD line sensor 17' is employed in lieu of the CCD line sensor 17 comprising the sensor chips 17a, 17a, . . . arrayed in a line, and the reading circuit 21 performs the binning processing with respect to both the main scanning direction and the sub-scanning direction. As illustrated in FIG. 8, the CCD line sensor 17' comprises four rows of the sensor chips 17a, 17a, . . . , which rows stand side by side with respect to the sub-scanning direction.

Specifically, in the third embodiment, in cases where the pixel size instructed by the pixel size instructing signal P is 100 μm, the reading circuit 21 reads the accumulated electric charges of the CCD line sensor 17', which accumulated electric charges are obtained from each set of 32 sensor chips 17a, 17a, . . . adjacent to one another in the main scanning direction and in the sub-scanning direction (i.e., each set composed of eight sensor chips 17a, 17a, . . . arrayed in the main scanning direction×four sensor chips 17a, 17a, . . . arrayed in the sub-scanning direction=32 sensor chips 17a, 17a, . . . ), together. In this manner, the binning processing is performed with respect to the accumulated electric charges, which are obtained from each set of the 32 sensor chips 17a, 17a, . . . adjacent to one another in the main scanning direction and in the sub-scanning direction. The accumulated electric charges, which have thus been read together from each set of the 32 sensor chips 17a, 17a, . . . , are taken as the read electric charges corresponding to one pixel.

Also, in cases where the pixel size instructed by the pixel size instructing signal P is 200 μm, the reading circuit 21 reads the accumulated electric charges of the CCD line sensor 17', which accumulated electric charges are obtained from each set of 64 sensor chips 17a, 17a, . . . adjacent to one another in the main scanning direction and in the sub-scanning direction (i.e., each set composed of 16 sensor chips 17a, 17a, . . . arrayed in the main scanning direction× four sensor chips 17a, 17a, . . . arrayed in the sub-scanning direction=64 sensor chips 17a, 17a, . . . ), together. In this manner, the binning processing is performed with respect to the accumulated electric charges, which are obtained from each set of the 64 sensor chips 17a, 17a, . . . adjacent to one another in the main scanning direction and in the sub-scanning direction. The accumulated electric charges, which have thus been read together from each set of the 64 sensor chips 17a, 17a, . . . , are taken as the read electric charges corresponding to one pixel.

The other operations of the processing are performed in the same manner as those in the first embodiment described above. In this manner, the pixel size in the main scanning direction and the pixel size in the sub-scanning direction are set in accordance with the pixel size instructing signal P.

With the third embodiment, the binning processing is performed with respect to both the main scanning direction and the sub-scanning direction. Therefore, the number of stages for reading the accumulated electric charges is capable of being kept (small. Accordingly, noise is capable of being reduced, and the reading speed is capable of being kept high.

In the first, second, and third embodiments of the radiation image read-out apparatus in accordance with the present invention, the stimulable phosphor sheet 13 is moved by the endless belt 18 at the predetermined speed, and the sub-scanning with the stimulating rays 10 is thereby performed. However, the means for the sub-scanning with the stimulating rays 10 is not limited to the technique utilizing the endless belt 18. For example, rollers may be utilized for moving the stimulable phosphor sheet 13. As another alternative, the stimulable phosphor sheet 13 may be kept stationary, and the stimulating ray irradiating means and the CCD line sensor, and the like, may be moved together with respect to the stimulable phosphor sheet 13.

What is claimed is:

1. A radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a CCD line sensor comprising a plurality of photo electric converting sections, which are arrayed along the linear area of the stimulable phosphor sheet exposed to the linear stimulating rays, the received light being subjected to photoelectric conversion performed by the CCD line sensor, and iii) moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays, wherein the improvement comprises the steps of:
  a) reading accumulated electric charges of the CCD line sensor, which accumulated electric charges are obtained from each set of n number of the photoelectric converting sections adjacent to one another in the array direction of the plurality of the photoelectric converting sections, where $2 \leqq n$, together such that the value of n is capable of being altered, the accumulated electric charges, which have thus been read together from the set of the photoelectric converting sections, being taken as an image signal component corresponding to one pixel, and
  b) setting the value of n in accordance with image recording information and/or diagnostic information.

2. A method as defined in claim 1 wherein the method further comprises the steps of:
  performing addition processing on each set of image signal components having been obtained, each of which image signal components corresponds to one of m number of read-out lines standing side by side with respect to the sub-scanning direction, where $2 \leqq m$, and which image signal components are adjacent to one another in the sub-scanning direction, such that the value of m is capable of being altered, a sum of the set of the image signal components, which sum has been obtained from the addition processing, being taken as one of image signal components corresponding to one line, and
  setting the value of m in accordance with the image recording information and/or the diagnostic information.

3. A method as defined in claim 1 wherein the method further comprises the steps of:
  altering a sub-scanning speed of the movement in the sub-scanning direction, and
  setting the sub-scanning speed in accordance with the image recording information and/or the diagnostic information.

4. A radiation image read-out method, comprising the steps of:
  i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
  ii) receiving light, which is emitted by the stimulable phosphor sheet, with a CCD line sensor comprising a plurality of photoelectric converting sections, which are arrayed along the linear area of the stimulable phosphor sheet exposed to the linear stimulating rays and along a sub-scanning direction intersecting with a length direction of the linear area of the stimulable phosphor sheet exposed to the linear stimulating rays, the received light being subjected to photoelectric conversion performed by the CCD line sensor, and
  iii) moving the stimulable phosphor sheet with respect to the stimulating ray irradiating means and the CCD line sensor and in the sub-scanning direction intersecting with the length direction of the linear area of the stimulable phosphor sheet exposed to the linear stimulating rays, wherein the improvement comprises the steps of:
  a) reading accumulated electric charges of the CCD line sensor, which accumulated electric charges are obtained from each set of n number of the photoelectric converting sections adjacent to one another in the array direction of the plurality of the photoelectric converting sections along the linear area of the stimulable phosphor sheet exposed to the linear stimulating rays, where $2 \leqq n$, and m number of the photoelectric converting sections adjacent to one another in the sub-scanning direction, where $2 \leqq m$, together such that the value of n is capable of being altered, the accumulated electric charges, which have thus been read together from the set of the photoelectric converting sections, being taken as an image signal component corresponding to one pixel, and
  b) setting the value of n and the value of m in accordance with image recording information and/or diagnostic information.

5. A radiation image read-out method, comprising the steps of:
  i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
  ii) receiving light, which is emitted by the stimulable phosphor sheet, with a CCD line sensor comprising a plurality of photoelectric converting sections, which are arrayed along the linear area of the stimulable phosphor sheet exposed to the linear stimulating rays, the received light being subjected to photoelectric conversion performed by the CCD line sensor, and
  iii) moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays, wherein the improvement comprises the steps of:
  a) performing addition processing on each set of output signal components having been obtained from the CCD line sensor, each of which output signal components corresponds to one of m number of read-out lines standing side by side with respect to the sub-scanning direction, where $2 \leqq m$, and which output signal components are adjacent to one another in the sub-scanning direction, such that the value of m is capable of being altered, a sum of the set of the output signal components, which sum has been obtained from the addition processing, being taken as one of image signal components corresponding to one line, and
  b) setting the value of m in accordance with image recording information and/or diagnostic information.

6. A radiation image read-out method, comprising the steps of:
  i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
  ii) receiving light, which is emitted by the stimulable phosphor sheet, with a CCD line sensor comprising a plurality of photoelectric converting sections, which are arrayed along the linear area of the stimulable phosphor sheet exposed to the linear stimulating rays, the received light being subjected to photoelectric conversion performed by the CCD line sensor, and iii) moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays, wherein the improvement comprises the steps of:
a) altering a sub-scanning speed of the movement in the sub-scanning direction, and
b) setting the sub-scanning speed in accordance with image recording information and/or diagnostic information.

7. A radiation image read-out apparatus, comprising:
i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation,
ii) a CCD line sensor comprising a plurality of photoelectric converting sections, which are arrayed along the linear area of the stimulable phosphor sheet exposed to the linear stimulating rays, and
iii) sub-scanning means for moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays,
wherein the improvement comprises the provision of:
a) reading means for reading accumulated electric charges of the CCD line sensor, which accumulated electric charges are obtained from each set of n number of the photoelectric converting sections adjacent to one another in the array direction of the plurality of the photoelectric converting sections, where $2 \leq n$, together such that the value of n is capable of being altered, and taking the accumulated electric charges, which have thus been read together from the set of the photoelectric converting sections, as an image signal component corresponding to one pixel, and
b) control means for setting the value of n in accordance with image recording information and/or diagnostic information.

8. An apparatus as defined in claim 7 wherein the apparatus further comprises:
signal addition processing means for performing addition processing on each set of image signal components having been obtained from the reading means, each of which image signal components corresponds to one of m number of read-out lines standing side by side with respect to the sub-scanning direction, where $2 \leq m$, and which image signal components are adjacent to one another in the sub-scanning direction, such that the value of m is capable of being altered, and taking a sum of the set of the image signal components, which sum has been obtained from the addition processing, as one of image signal components corresponding to one line, and
control means for setting the value of m in accordance with the image recording information and/or the diagnostic information.

9. An apparatus as defined in claim 7 wherein the apparatus further comprises:
means for altering a sub-scanning speed of the movement in the sub-scanning direction, which movement is performed by the sub-scanning means, and
control means for setting the sub-scanning speed in accordance with the image recording information and/or the diagnostic information.

10. A radiation image read-out apparatus, comprising:
i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation,
ii) a CCD line sensor comprising a plurality of photoelectric converting sections, which are arrayed along the linear area of the stimulable phosphor sheet exposed to the linear stimulating rays and along a sub-scanning direction intersecting with a length direction of the linear area of the stimulable phosphor sheet exposed to the linear stimulating rays, and
iii) sub-scanning means for moving the stimulable phosphor sheet with respect to the stimulating ray irradiating means and the CCD line sensor and in the sub-scanning direction intersecting with the length direction of the linear area of the stimulable phosphor sheet exposed to the linear stimulating rays,
wherein the improvement comprises the provision of:
a) reading means for reading accumulated electric charges of the CCD line sensor, which accumulated electric charges are obtained from each set of n number of the photoelectric converting sections adjacent to one another in the array direction of the plurality of the photoelectric converting sections along the linear area of the stimulable phosphor sheet exposed to the linear stimulating rays, where $2 \leq n$, and m number of the photoelectric converting sections adjacent to one another in the sub-scanning direction, where $2 \leq m$, together such that the value of n is capable of being altered, and taking the accumulated electric charges, which have thus been read together from the set of the photoelectric converting sections, as an image signal component corresponding to one pixel, and
b) control means for setting the value of n and the value of m in accordance with image recording information and/or diagnostic information.

11. A radiation image read-out apparatus, comprising:
i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation,
ii) a CCD line sensor comprising a plurality of photoelectric converting sections, which are arrayed along the linear area of the stimulable phosphor sheet exposed to the linear stimulating rays, and
iii) sub-scanning means for moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays,
wherein the improvement comprises the provision of:

a) signal addition processing means for performing addition processing on each set of output signal components having been obtained from the CCD line sensor, each of which output signal components corresponds to one of m number of read-out lines standing side by side with respect to the sub-scanning direction, where $2 \leq m$, and which output signal components are adjacent to one another in the sub-scanning direction, such that the value of m is capable of being altered, and taking a sum of the set of the output signal components, which sum has been obtained from the addition processing, as one of image signal components corresponding to one line, and b) control means for setting the value of m in accordance with image recording information and/or diagnostic information.

12. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a CCD line sensor comprising a plurality of photo-electric converting sections, which are arrayed along the linear area of the stimulable phosphor sheet exposed to the linear stimulating rays, and iii) sub-scanning means for moving the stimulable phosphor sheet with respect to the stimulating ray irradiating means and the CCD line sensor and in a sub-scanning direction intersecting with a length direction of the linear area of the stimulable phosphor sheet exposed to the linear stimulating rays, wherein the improvement comprises the provision of:

a) means for altering a sub-scanning speed of the movement in the sub-scanning direction, which movement is performed by the sub-scanning means, and b) control means for setting the sub-scanning speed in accordance with image recording information and/or diagnostic information.

* * * * *